United States Patent
Majka et al.

(10) Patent No.: US 10,331,618 B2
(45) Date of Patent: Jun. 25, 2019

(54) SOFTWARE DISCOVERY WITH VARIABLE SCAN FREQUENCY

(71) Applicant: International Business Machines Corporation, Armonk, NY (US)

(72) Inventors: Grzegorz Majka, Cracow (PL); Artur Obrzut, Cracow (PL); Ryszard Olkusnik, Cracow (PL); Jacek Stezowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 14/055,224

(22) Filed: Oct. 16, 2013

(65) Prior Publication Data

US 2014/0108469 A1 Apr. 17, 2014

(30) Foreign Application Priority Data

Oct. 16, 2012 (GB) .................................. 1218493.3

(51) Int. Cl.
*G06F 16/14* (2019.01)
*G06F 16/11* (2019.01)

(52) U.S. Cl.
CPC ............ *G06F 16/11* (2019.01); *G06F 16/152* (2019.01)

(58) Field of Classification Search
CPC ..... G06F 17/3007–17/30088; G06F 17/30115; G06F 17/301–17/30109; G06F 16/14–16/152
See application file for complete search history.

(56) References Cited

U.S. PATENT DOCUMENTS

| | | | |
|---|---|---|---|
| 6,832,218 B1 * | 12/2004 | Emens | G06F 17/30867 |
| 6,922,781 B1 * | 7/2005 | Shuster | G06F 21/564 |
| | | | 713/165 |
| 7,181,739 B1 * | 2/2007 | Harral | G06F 8/61 |
| | | | 717/170 |
| 7,966,612 B2 | 6/2011 | D'Alterio et al. | |
| 9,116,915 B1 * | 8/2015 | Lakshman | G06F 17/30233 |
| 2002/0049760 A1 * | 4/2002 | Scott | G06F 17/30067 |
| 2005/0289537 A1 | 12/2005 | Lee | |
| 2006/0184932 A1 | 8/2006 | Burnley et al. | |

(Continued)

OTHER PUBLICATIONS

Lee, et al., Oracle Fusion Middleware—Administrator's Guide for Oracle Adaptive Access Manager, Release 11g, Aug. 2010. (Year: 2010).*

(Continued)

*Primary Examiner* — Robert W Beausoliel, Jr.
*Assistant Examiner* — Nirav K Khakhar
(74) *Attorney, Agent, or Firm* — Yee & Associates, P.C.; Jeffrey LaBaw

(57) ABSTRACT

A file discovery method, comprising receiving file discovery data comprising, for each of a plurality of files, discovery information and signature data, the discovery information for a first file of the plurality of files being indicative of at least one directory to be scanned for another of the plurality of files relative to a first directory, scanning, in a first scanning operation, a file system for the first file, and scanning, in a second scanning operation subsequent to the first scanning operation, the at least one directory for a second file matching signature data comprised by the file discovery data using a path to the first file as the first directory.

18 Claims, 1 Drawing Sheet

(56) References Cited

U.S. PATENT DOCUMENTS

| | | |
|---|---|---|
| 2007/0198423 A1 | 8/2007 | Carbone et al. |
| 2008/0235664 A1 | 9/2008 | Carbone et al. |
| 2008/0250038 A1 | 10/2008 | Di Litta et al. |
| 2009/0248636 A1 | 10/2009 | Gangemi et al. |
| 2012/0131012 A1* | 5/2012 | Taylor .................. G06F 17/301 707/748 |
| 2012/0173511 A1* | 7/2012 | Eto .................. G06F 17/30091 707/711 |
| 2014/0351936 A1* | 11/2014 | Hao ...................... G06F 21/561 726/24 |

OTHER PUBLICATIONS

Jensen, et al., ACM SIGMOD Record, vol. 21 Issue 3, Sep. 1992, pp. 35-43. (Year: 1992).*
Groff, et al., SQL: The Complete Reference, 1999, pp. 78-80. (Year: 1999).*
"Method and Apparatus for Optimization of Time Constrained File System Hierarchy Scanning," IP.com Prior Art Database Technical Disclosure No. IPCOM000196581D, dated Jun. 7, 2010, 9 pages.
"Software Detection on Unix System Without Software Catalog on Agent Machine," IP.com Prior Art Database Technical Disclosure No. IPCOM000210140D, dated Aug. 26, 2011, 3 pages.

* cited by examiner

SOFTWARE DISCOVERY WITH VARIABLE SCAN FREQUENCY

CROSS REFERENCE TO RELATED APPLICATION

This application claims the benefit of priority to United Kingdom Patent Application Serial No. 1218493.3, filed on Oct. 16, 2012, the contents of which are hereby incorporated by reference.

BACKGROUND

The present disclosure is an invention disclosure relating to a file discovery method, a file discovery system as well as a corresponding computer program product.

It is known to maintain a catalog of the software installed on a computing device. Such a catalog may be used for determining when it is appropriate to update software installed on the computing device, for determining license fees that may be incurred by virtue of installation of the software on the computing device, etc. For maintaining the catalog, it is likewise known to employ software discovery for determining what software is installed on the computing device.

The present disclosure expounds upon this background.

BRIEF SUMMARY

Loosely speaking, the present disclosure teaches a software discovery method that scans different portions of a file system at different frequencies. To this aim, a software scanner may receive information that specifies how frequently particular portions of a file system are to be scanned. For example, the information may specify that some directories are to be scanned four times more frequently than some other directories. Such information may be conveyed to the software scanner directly from a user or via the software catalog. Similarly, a software catalog may include information that specifies, in terms of a relative or absolute location, directories that are to be scanned. For example, the information may specify directories to be scanned relative to a location of a given piece of software. Once the piece of software has been discovered, the scanner will scan the directories whose location is specified relative to the location at which the piece of software was discovered.

By controlling the frequency with which different portions of the file system are scanned, the burden to a (client) machine performing the scans can be reduced without detriment to the quality of the scan results. In fact, the quality of the scan results can be improved. Inter alia, average detection time can be decreased.

In one aspect, as touched upon supra, the present disclosure relates to a file discovery method, e.g. a software discovery method as described above.

The method may comprise receiving file discovery data, e.g. a software catalog. In the present disclosure, the term "file discovery data" may be understood as data for monitoring the presence/absence of a plurality of files on (each of) one or more file systems, e.g. for carrying out and/or documenting an inventory of the plurality of files on a (respective) file systems.

The file discovery data may comprise, e.g. for any (one or more or each) of a plurality of files, discovery information and/or signature data. For example, the file discovery data may comprise at least one of discovery information and signature data for each respective one of any (one or more or each) of a plurality of files.

Any (one or more or each) of the files may be a software application, i.e. a quantity of code capable of self-contained execution, e.g. that can be executed without requiring code other than that provided by an operating system of a computing entity. Similarly, any (one or more or each) of the files may be a collection of data, e.g. a database required for proper operation of a software application.

The signature data may (uniquely) identify the respective file. For example, the signature data may comprise any (one or more or all) of a name of the file, a part number of the file/application, a size of the file, a path name identifying a path to the file or to a folder in which the file is stored, etc. Similarly, the signature data may comprise a numeric value (e.g. a binary or hexadecimal value) indicative of or derived/calculated from any (one or more) of an installation time, a size, a content, etc. of the file.

The discovery information may comprise data specifying how to effect software discovery, e.g. how to effect software discovery subsequent to discovery of a specified file. The discovery information for a (respective) file of the plurality of files may be indicative of one or more directories to be scanned (for one or more other files of the plurality of files). The discovery information may specify the one or more directories in absolute terms (e.g. by specifying a (respective) path from a root volume of a file system to any (one or more or each) of the directories) and/or relative to a (respective) directory. For example, the discovery information for a (first) file of the plurality of files may be indicative of at least one directory to be scanned for another of the plurality of files relative to a (first) directory. The (first) directory may be a directory in which the (first) file is (discovered to be) located.

The method may comprise scanning (any portion of, e.g. an entirety of) a file system for one or more files, e.g. for any (one or more or all) of the files (respectively) identified by (the signature data in) the file discovery data. As such, the method may comprise scanning the file system for the aforementioned first file. This scanning may be (carried out in) a first scanning operation, e.g. as discussed hereinbelow.

The file system may be the (local) file system of an operating system operating on a laptop computer, a personal computer or other single end-user computing device. Similarly, the file system may be the (local) file system of an operating system operating in a virtual (computing) environment and/or in a computing environment configured to be accessible only to a single user, e.g. a user account on a personal computer or a user account in a computer network. As such, the file system may be limited to files stored on one or more storage devices attached directly to such a laptop computer, personal computer, etc. Similarly, the file system may comprise one or more files located on remote storage devices, i.e. on storage devices at a location that is remote from (i.e. in a different room/building/town than) the computing device performing the scanning.

The (process of) scanning, i.e. from onset to termination, can be termed a "scanning operation" to distinguish individual iterations/instances of scanning from one another. Each of the scanning operations may consist of scanning a (respective) portion of a file system. For example, one scanning operation may consist of scanning a (respective) portion of a file system, whereas another scanning operation may consist of scanning the same or a (partially or wholly) different portion of a file system, e.g. the same or a (partially or wholly) different set of directories of the file system. In other words, the scanning, i.e. a respective scanning operation, may be limited to searching through a (respective) portion of a file system only once for files, e.g. for the files (respectively) identified by (the signature data in) the file discovery data. As such, the scanning, i.e. a respective scanning operation, may be limited to searching through each of one or more directories only once for files. As touched upon above, different instances of scanning, i.e. different scanning operations, may search through (respectively) different sets of directories.

The scanning operations may be temporally distinct from one another. In other words, the scanning operations may be (effected) such that no two scanning operations are carried out contemporaneously. Similarly, the scanning operations may be (effected) such that no two scanning operations are temporally adjacent. In other words, there may be a temporal gap between the end of each respective scanning operation and the beginning of a (respective) next subsequent scanning operation. For example, the method may comprise carrying out (at least) one scanning operation per day, (at least) one scanning operation per week, at least one scanning operation per week and less than one scanning operation per day, at least one scanning operation per fortnight and less than one scanning operation per week or at least one scanning operation per month and less than one scanning operation per fortnight.

The scanning (of a portion of a file system for files) may comprise comparing, for each of a (specified) set of files stored in that portion of the file system, one or more file parameters of the respective file with the signature data, e.g. with the (respective) signature data for each of the plurality of files (for which the file discovery data comprises signature data).

The (specified) set of files may comprise any (one or more or each) of the files stored in that portion of the file system. For example, the (specified) set of files may be the set of all executable files stored in that portion of the file system. The set of files may be specified by a user input and/or by one or more stored parameters, e.g. by a set of parameters stored in the file discovery data and/or in a scanner that effects the scanning.

The comparing (of one or more file parameters of a respective file with the signature data) may comprise comparing each respective file parameter with a respective portion of the signature data. For example, if the signature data comprises (data representative of) a file name and a size of the file, the comparing (of file parameters and signature data) may comprise comparing a file name of the respective file with a portion of the signature data representative of a file name. Similarly, if the signature data comprises (data representative of) a file name and a size of the file, the comparing (of file parameters and signature data) may comprise comparing a file size of the respective file with a portion of the signature data representative of a file size.

The method may comprise effecting one or more (specified) actions if the comparing (of file parameters and signature data) reveals that a file (stored in the scanned portion of the file system) matches a file for which the file discovery data comprises signature data, e.g. if the comparing reveals that each respective file parameter of a file system file matches (e.g. is identical to) respective signature data. For example, the actions may comprise storing an indication that the respective file has been discovered and/or storing (data representative of) a path to the file. The path may specify a location of the file in the (respective) file system, e.g. specify a path from a root volume of the file system to a directory containing the file. Similarly, the actions may comprise reporting discovery of the respective file to another computing device/environment (than the one hosting the scanned file system), e.g. to a server. The reporting may be limited to files whose discovery has not yet been reported to the (respective) other computing device/environment. The reporting may comprise communicating (data representative of) a path to the file. Furthermore, the reporting may comprise communicating data indicative of an installation time of the file.

As touched upon above, the discovery information for the (aforementioned) first file may be indicative of at least one directory to be scanned for another of the plurality of files relative to a first directory.

The method may comprise scanning this at least one directory for a second file matching signature data comprised by said file discovery data using a path to the (aforementioned) first file as the first directory. This scanning may be carried out in a second scanning operation that is subsequent to the aforementioned first scanning operation (that scans for the first file). As such, the method may comprise scanning the at least one directory for a second file having (a set of) file parameters that match signature data of any of the plurality of files (for which the file discovery data comprises signature data). The path to the first file may specify a location at which the first file was discovered in the first scanning operation.

As touched upon above, the first scanning operation may comprise scanning a first set of directories, e.g. an entirety of the file system, and the second scanning operation may comprise scanning solely a subset of the first set of directories.

As touched upon above, the discovery information for a (respective) file of the plurality of files may be indicative of one or more directories to be scanned (for one or more other files of the plurality of files), e.g. relative to a (respectively specified) directory. For example, the discovery information for a (respective) file may be indicative of one or more directories to be scanned relative to a directory where the (respective) file is located. The one or more directories may be/comprise the (respectively specified) directory. Similarly, the one or more directories may be/comprise all subdirectories of the (respectively specified) directory. Furthermore, the one or more directories may be/comprise one or more $n^{th}$-degree parent directories of the (respectively specified) directory, where $n=1$ specifies a parent directory, $n=2$ specifies a grandparent directory, $n=3$ specifies a great grandparent directory, etc. Similarly, the one or more directories may be/comprise all subdirectories of an $n^{th}$-degree parent directory. The discovery information may specify the one or more directories by a path. For example, the discovery information may specify that a subdirectory "application_XYZ_data" of a directory "application_XYZ" containing an executable file "application_XYZ.exe" is to be scanned by specifying the path ".\application_XYZ_data" (as discovery information in conjunction with the file discovery data for the file "application_XYZ.exe").

The method may comprise receiving data indicative of a scanning frequency for any (one or more or each) directory (of the file system). For example, the method may comprise receiving data indicative, for at least one directory, of a scanning frequency for the at least one directory. The scanning frequency may be less than once per scanning operation and greater than never. Similarly, the scanning frequency may be once per scanning operation, once and never again, or never. As such, the method may comprise scanning a first plurality of directories of the file system at a first scanning frequency and scanning a second plurality of directories of the file system at a second scanning frequency.

For example, the method may comprise scanning a first plurality of directories of the file system during each scanning operation and scanning a second plurality of directories of the file system (only) during every second/third/fourth/ etc. scanning operation.

The scanning frequency of a (respective) directory may be specified relative to a scanning frequency of another directory. The relative scanning frequency may depend on the location of the (respective) directories to one another. For example, the data indicative of a scanning frequency may specify that a parent directory of a directory comprising a file matching signature data comprised by the file discovery data is to be scanned more frequently (e.g. by a factor x, for example 1.5 or 2 or 3 times more frequently) than (a subdirectory of) the directory comprising the file matching signature data. Similarly, the data indicative of a scanning frequency may specify that a subdirectory of a directory comprising a file matching signature data comprised by the file discovery data is to be scanned less frequently (e.g. by a factor x, for example 1.5 or 2 or 3 times less frequently) than (a parent directory of) the directory comprising the file matching signature data. Similarly, the data indicative of a scanning frequency may specify that directories on remote storage devices are to be scanned less frequently (e.g. by a factor x, for example 1.5 or 2 or 3 times less frequently) than directories on local storage devices (attached directly to the computing device performing the scanning). Furthermore, the relative scanning frequency may depend on the name of the (respective) directories. For example, the data indicative of a scanning frequency may specify that a directory named "tmp" or "lib" is to be scanned less frequently (e.g. by a factor x, for example 1.5 or 2 or 3 times less frequently) than a directory named "opt" or "var."

The method may comprise storing a time of scanning for any (one or more or each) directory scanned. For example, the method may comprise storing a time of scanning for each directory scanned during at least one of the first scanning operation and the second scanning operation. The time of scanning may be a time at which the respective directory was scanned. Similarly, the time of scanning may be represented by data indicative of (e.g. a start time, a completion time, a unique ID of) a scanning operation during which the respective directory was scanned. The method may comprise determining, using a time of scanning stored for a respective directory, whether to scan that directory in a respective scanning operation. As such, the method may comprise scanning the respective directory in the respective scanning operation if (and only if) the determination is affirmative.

The method may comprise storing data designating exclusion of one or more directories from subsequent scans if no files matching the signature data for any of the plurality of files are discovered during two (or three or four) scanning operations (e.g. during any of the first scanning operation and the second scanning operation) that each comprises scanning (each of) the one or more directories. In other words, the method may refrain from scanning a set of one or more directories once a specified number of scans have been carried out on that set of directories without revealing files in those directories belonging to the plurality of files (for which the file discovery data comprises signature data).

While the teachings of the present disclosure have been discussed hereinabove mainly in the form of a method, the teachings may be embodied, mutatis mutandis, in the form of a system, e.g. a file discovery system, or a computer program product, as will be appreciated by the person skilled in the art.

The system may be configured and adapted to effect any of the actions described above with respect to the disclosed method. For example, the system may comprise a control component that effects any of the actions described above with respect to the disclosed method.

The system may comprise a storage device that stores data, e.g. data as described hereinabove.

The system may comprise a file system scanner that scans a file system, e.g. as described hereinabove.

The system may comprise a user input device that receives user inputs as discussed hereinabove.

Any of the aforementioned components of the system may communicate with any other of the aforementioned components of the system. In this respect, the system may comprise one or more communication busses/links interconnecting the respective components.

DETAILED DESCRIPTION

Figure 1:
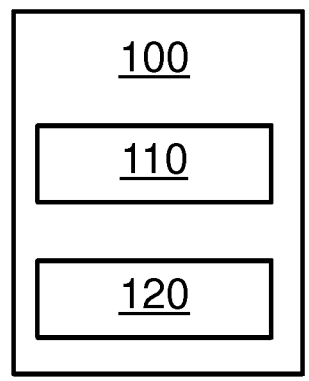
FIG. 1 schematically shows an embodiment of a file discovery system in accordance with the present disclosure.

FIG. 1 schematically shows an embodiment of a file discovery system 100 in accordance with the present disclosure, e.g. as described above.

In the illustrated embodiment, file discovery system 100 comprises a storage device 110 and a file system scanner 120.

Figure 2:
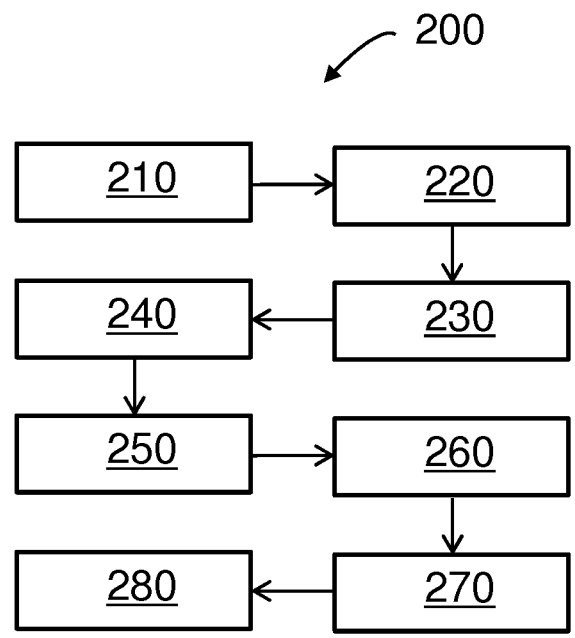
FIG. 2 schematically shows a flow diagram of an embodiment of a file discovery method in accordance with the present disclosure.

FIG. 2 schematically shows a flow diagram 200 of an embodiment of a file discovery method in accordance with the present disclosure, e.g. as described above.

In the illustrated embodiment, flow diagram 200 comprises a step 210 of receiving file discovery data, a step 220 of scanning a portion of a file system in a first scanning operation, a step 230 of scanning at least one directory in a second scanning operation, an optional step 240 of receiving data indicative of a scanning frequency for at least one directory, an optional step 250 of scanning a first plurality of directories at a first scanning frequency, an optional step 260 of scanning a second plurality of directories at a second scanning frequency, an optional step 270 of storing a time of scanning of a directory and an optional step 280 of storing data designating exclusion of a directory from subsequent scans.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/non-compulsoriness. In other words, something that "may" can, but need not.

In the present disclosure, any "receiving" may be accompanied by a "storing" of the received element/information, e.g. in a computer memory, on a hard disk, in a flash storage device or in any other storage device. In other words, where the method comprises a receiving of an element/information, the method may comprise a storing of the received element/information.

In the present disclosure, expressions in parentheses are to be understood as being optional. As used in the present disclosure, quotation marks may emphasize that the expression in quotation marks may also be understood in a figurative sense. As used in the present disclosure, quotation marks may identify a particular expression under discussion.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A file discovery method, comprising steps of:
   receiving file discovery data comprising, for each of a plurality of files, discovery information and signature data, said discovery information for a first file of said plurality of files being indicative of at least one directory of a file system to be scanned for another of said plurality of files relative to a first directory;
   scanning, in a first scanning operation, a portion of said file system for said first file; and
   responsive to locating said first file in said first scanning operation, scanning, in a second scanning operation subsequent to said first scanning operation, said at least one directory for a second file matching said signature data comprised by said file discovery data using a path to said first file as said first directory, wherein said first scanning operation is performed at a first scanning frequency and said second scanning operation is performed at a second scanning frequency, wherein said first scanning frequency is a different frequency than said second scanning frequency such that different portions of said file system are scanned at different frequencies.

2. The method of claim 1, wherein said first scanning operation comprises scanning a first set of directories, and said second scanning operation comprises scanning solely a subset of said first set of directories.

3. The method of claim 1, wherein said at least one directory is an $n^{th}$-degree parent directory of said first directory and all subdirectories of said $n^{th}$-degree parent directory.

4. The method of claim 1, further comprising:
   receiving data indicative, for at least one directory, of a scanning frequency for said at least one directory, wherein said scanning frequency is less than once per scanning operation and greater than never.

5. The method of claim 1, further comprising:
   storing a time of scanning for each directory scanned during at least one of said first scanning operation and said second scanning operation.

6. The method of claim 1, further comprising:
   storing data designating exclusion of a second directory from subsequent scans if no files matching said signature data for any of said plurality of files are discovered during any of said first scanning operation and said second scanning operation, wherein each of said first scanning operation and said second scanning operation comprises scanning said second directory.

7. A file discovery system, comprising:
   a storage device configured to store file discovery data comprising, for each of a plurality of files, discovery information and signature data, said discovery information for a first file of said plurality of files being indicative of at least one directory of a file system to be scanned for another of said plurality of files relative to a first directory; and
   a file system scanner configured to scan a portion of said file system for said first file in a first scanning operation, wherein said file system scanner, in a second scanning operation subsequent to said first scanning operation, is configured to scan, responsive to locating said first file in said first scanning operation, said at least one directory for a second file matching said signature data comprised by said file discovery data using a path to said first file as said first directory, wherein said file system scanner is configured to perform said first scanning operation at a first scanning frequency and said second scanning operation at a second scanning frequency, wherein said first scanning frequency is a different frequency than said second scanning frequency such that different portions of said file system are scanned at different frequencies.

8. The system of claim 7, wherein said first scanning operation comprises scanning a first set of directories; and said second scanning operation comprises scanning solely a subset of said first set of directories.

9. The system of claim 7, wherein said at least one directory is an $n^{th}$-degree parent directory of said first directory and all subdirectories of said $n^{th}$-degree parent directory.

10. The system of claim 7, wherein said storage device stores data indicative, for at least one directory, of a scanning frequency for said at least one directory, and said scanning frequency is less than once per scanning operation and greater than never.

11. The system of claim 7, wherein said storage device stores a time of scanning for each directory scanned during at least one of said first scanning operation and said second scanning operation.

12. The system of claim 7, wherein said file system scanner excludes a second directory from subsequent scans if no files matching said signature data for any of said plurality of files are discovered during any of said first scanning operation and said second scanning operation, and
   wherein each of said first scanning operation and said second scanning operation comprises scanning said second directory.

13. A computer program product stored on a non-transitory computer usable medium, comprising computer readable program code configured to cause a computer to perform a method according to claim 1 when said program code is run on said computer.

14. The method of claim 1, further comprising:
   reporting discovery of the second file to a computing device.

15. The method of claim 1, wherein the signature data uniquely identifies at least one file of the plurality of files.

16. The method of claim 1, further comprising:
   responsive to a second file matching said signature data pursuant to the second scanning operation, storing an indication that said second file has been discovered.

17. A file discovery method, comprising steps of:
   receiving file discovery data comprising, for each of a plurality of files, discovery information and signature data, said discovery information for a first file of said plurality of files being indicative of at least one directory of a file system to be scanned for another of said plurality of files relative to a first directory;
   scanning, in a first scanning operation, a portion of said file system for said first file; and responsive to locating said first file in said first scanning operation, scanning, in a second scanning operation subsequent to said first scanning operation, said at least one directory for a second file matching said signature data comprised by said file discovery data using a path to said first file as said first directory;

responsive to locating said first file in said first scanning operation, scanning, in a second scanning operation subsequent to said first scanning operation, said at least one directory for a second file matching said signature data comprised by said file discovery data using a path to said first file as said first directory; and receiving data indicative of a first scanning frequency for the first directory and a second scanning frequency for the second directory.

18. The method of claim 17, wherein the second scanning frequency for the second directory is specified in the data relative to the first scanning frequency for the first directory.

* * * * *